United States Patent [19]

Wood et al.

[11] Patent Number: 5,791,744
[45] Date of Patent: Aug. 11, 1998

[54] PNEUMATIC TRAINLINE CONTROL UNIT

[75] Inventors: James A. Wood, Spartanburg; Richard J. Mazur, Greer, both of S.C.

[73] Assignee: Westinghouse Air Brake Company, Wilmerding, Pa.

[21] Appl. No.: 789,920

[22] Filed: Jan. 28, 1997

[51] Int. Cl.[6] .................... B60T 8/02; B60T 8/36
[52] U.S. Cl. ............... 303/7; 303/15; 303/122.15; 303/128
[58] Field of Search ............... 303/3.7, 15, 20, 303/28, 122.15, 128

[56]  References Cited

U.S. PATENT DOCUMENTS 4,598,953  7/1986  Wood et al. .................. 303/122.15
5,503,464  4/1996  Cunkelman .................... 303/15

Primary Examiner—Matthew C. Graham
Attorney, Agent, or Firm—James Ray & Associates

[57]  ABSTRACT

A pneumatic trainline control unit receives air from a first pneumatic trainline which it uses to charge and maintain pressure in a second pneumatic trainline. It also provides brake control pressure to a universal pneumatic brake unit on a rail vehicle upon receiving an emergency braking request from the second trainline. The pneumatic trainline control unit includes an air piloted transfer valve, an air piloted maintaining valve, a charging magnet valve, an emergency release magnet valve, a low pressure switch, an air piloted vent valve and a pipe network. The pipe network allows the first trainline to supply air to the transfer valve, the charging valve and the maintaining valve. The transfer valve features a transfer pilot port. It connects a command port of the pneumatic trainline control unit to atmosphere unless its transfer pilot port receives the emergency braking request in which case it connects the pipe network to the command port. The low pressure switch closes if the second trainline charges to a preset pressure. Upon closure of the pressure switch and a manually initiated command from the controller, the charging valve allows the pipe network to charge the second trainline to a minimum threshold level. The maintaining valve features a main pilot port. It permits the pipe network to keep the second trainline charged unless pressure at its main pilot port falls below the minimum threshold. When pressure in the second trainline drops faster than a predetermined rate, the vent valve vents the second trainline to atmosphere.

6 Claims, 7 Drawing Sheets

PNEUMATIC TRAINLINE CONTROL UNIT

CROSS-REFERENCE TO RELATED APPLICATIONS

This application is related to copending applications Ser. No. 08/790,574 and 08/789,919, entitled Universal Pneumatic Brake Control Unit and Brake Assurance Module, respectively, sharing the same filing date of the present application, Ser. No. 08/789,920 Jan. 28, 1997. These patent applications are assigned to the assignee of the present invention, and their teachings are incorporated into the present document by reference.

1. Field of the Invention

The present invention generally relates to a pneumatic trainline control unit for use within a brake control system to aid in the control of the brakes on at least one truck of a rail vehicle. More particularly, the present invention relates to a pneumatic trainline control unit that not only serves as a source of brake control pressure for a universal pneumatic brake unit but also assists in charging, maintaining and reducing pressure within a pneumatic trainline on the rail vehicle.

2. Background of the Invention

Modern train brake control systems typically use a central controller to control the brakes of the rail vehicles that comprise the train. A train operator located in the lead locomotive manipulates the brake handles of the train to apply and release the brakes of the trucks on each rail vehicle. The inputs from the brake handles are typically processed by a cab control unit and passed to a central controller. In response to these and other inputs, the central controller sends a brake command signal to each of the rail vehicles along a pneumatic trainline or an electrical trainline or both. The brake command signal can be the carrier of a request for service braking or one for emergency braking or both. Brake equipment on each rail vehicle applies or releases the brakes according to the dictates of the particular brake command signal received.

The service, release and emergency braking requests may be conveyed to the brake equipment on each rail vehicle through various routes. In the WABCO 26-C Brake Control System, for example, the brake pipe is used to convey the service, release and emergency braking requests. Most WABCO RT-5 Brake Control Systems convey the service and release braking requests on an electrical trainline and the emergency braking requests on the brake pipe. Other RT-5 Systems convey the emergency braking requests not only on the brake pipe but also via a separate electrical trainline to the electronic brake equipment on each rail vehicle of the train.

The brake equipment on each rail vehicle typically includes a combination of electrical and pneumatic (i.e., electropneumatic) equipment. The brake equipment in an RT-5 Brake Control System typically includes a master electronic unit (MEU) whose construction and operation are generally well known in the brake control art. The central controller sends the service and release braking requests along the electrical trainline to the MEU on each rail vehicle. The central controller sends the emergency braking requests to each rail vehicle along either the brake pipe or the separate electrical trainline or both.

The MEU on each rail vehicle receives this brake command signal and various other signals in response to which it directly controls the electropneumatic equipment according to principles well known in the brake control art. Specifically, the MEU generates the electrical signals which directly open or close the various valves of the prior art electropneumatic equipment which supply pressure to or vent pressure from the brake cylinders. The brakes of all the trucks on the rail vehicle apply and release accordingly.

The electropneumatic equipment of the prior art brake control systems discussed previously have certain disadvantages when compared to the inventions mentioned below, whose details are more fully set forth in the applications cited above. Such prior art equipment typically provides service braking, emergency braking and wheel slip and spin control functions from separate components. This requires a lot of space. Moreover, each component in these prior art systems is typically physically separated from the electronics that controls it. Large amounts of wiring are required to interconnect each component and its controlling electronics. Each rail vehicle, of course, bears the weight of this wiring.

It would therefore be highly desirable to have brake equipment in which service braking and emergency braking functions, and, if desired, wheel slip and spin control functions, can be consolidated along with their associated electronics within a single, and comparatively small, package. The amount of wiring that would be required to interconnect the various electropneumatic components and their associated electronics in each package would be significantly reduced as compared to the prior art equipment. This would reduce the weight that each rail vehicle would be required to bear. The single enclosure for each of the components and their associated electronics would also afford better protection from adverse environmental conditions.

It would be also be highly desirable to control the brakes at the truck level. In those prior art brake control systems featuring old electropneumatic brake equipment on each rail vehicle, the brakes are controlled only at the rail vehicle level. By controlling the brakes at each truck individually, this would allow for better overall control of the brakes given the inevitable variations in load weight, motion, wheel slippage and other factors affecting each rail vehicle.

It would be also be highly desirable to design such a package that either by itself or in conjunction with one or more other innovative devices can be used within and made a part of a variety of train brake control systems such as those used to control passenger trains, subway trains and trolleys. Examples of such systems include the WABCO 26-C, RT-2 and RT-5 Brake Control Systems.

It should be noted that the foregoing background information is provided to assist the reader in understanding the present invention. Accordingly, any terms of art used herein are not intended to be limited to any particular narrow interpretation unless specifically stated otherwise in this document.

SUMMARY OF THE INVENTION

The present invention provides a pneumatic trainline control unit for use with a universal pneumatic brake unit on a train. The train includes a first pneumatic trainline for supplying air to the present invention, a second pneumatic trainline for conveying an emergency braking request to the present invention and a central controller for issuing the braking request. In a presently preferred embodiment, the pneumatic trainline control unit includes an emergency transfer valve, a low pressure switch, a charging valve, an emergency release valve, a maintaining valve, a pipe network and a vent valve. The pipe network allows air received from the first trainline to flow to the emergency transfer valve, the charging valve and the maintaining valve. The emergency transfer valve features a transfer pilot port in communication with the second trainline. The emergency transfer valve permits a command port of the control unit to vent to atmosphere unless its transfer pilot port receives the emergency braking request in which case it permits the pipe network to communicate with the command port. The low pressure switch closes when pressure in the second trainline reaches or exceeds a preset low pressure. When opened upon both closure of the low pressure switch and a manually initiated command from the central controller, the charging valve allows air from the pipe network to charge the second trainline to at least a minimum threshold pressure. When opened by the central controller, the emergency release valve vents air from the second trainline to atmosphere. The maintaining valve features a main pilot port in communication with the second trainline. The maintaining valve maintains pressure within the second trainline by permitting air from the pipe network to charge the second trainline via a choke unless pressure at its main pilot port falls below the minimum threshold in which case the maintaining valve closes thereby preventing air from the pipe network from so charging the second trainline. When pressure within the second trainline drops faster than a predetermined rate, the vent valve vents air from the second trainline to atmosphere.

OBJECTIVES OF THE INVENTION

It is a primary objective of the present invention to provide a pneumatic trainline control unit for use with a universal pneumatic brake unit to assist in controlling the brakes on at least one truck of a rail vehicle in an RT-5 Brake Control System.

Another objective of the present invention is to provide a pneumatic trainline control unit that serves as a provider of a source of brake control pressure for a universal pneumatic brake unit on a rail vehicle in an RT-5 Brake Control System.

Yet another objective of the present invention is to provide a pneumatic trainline control unit that assists in charging, maintaining and reducing pressure within a brake pipe on a rail vehicle in an RT-5 Brake Control System.

Still another objective of the present invention is to provide a pneumatic trainline control unit that is capable of productive use in a variety of pneumatic systems.

In addition to the objectives and advantages listed above, various other objects and advantages of the present invention will become more readily apparent to persons skilled in the relevant art from a reading of the detailed description section of this document. Such other objects and advantages will become particularly apparent when the detailed description is considered along with the attached drawings and with the appended claims.

DETAILED DESCRIPTION OF THE INVENTION

Figure 1:
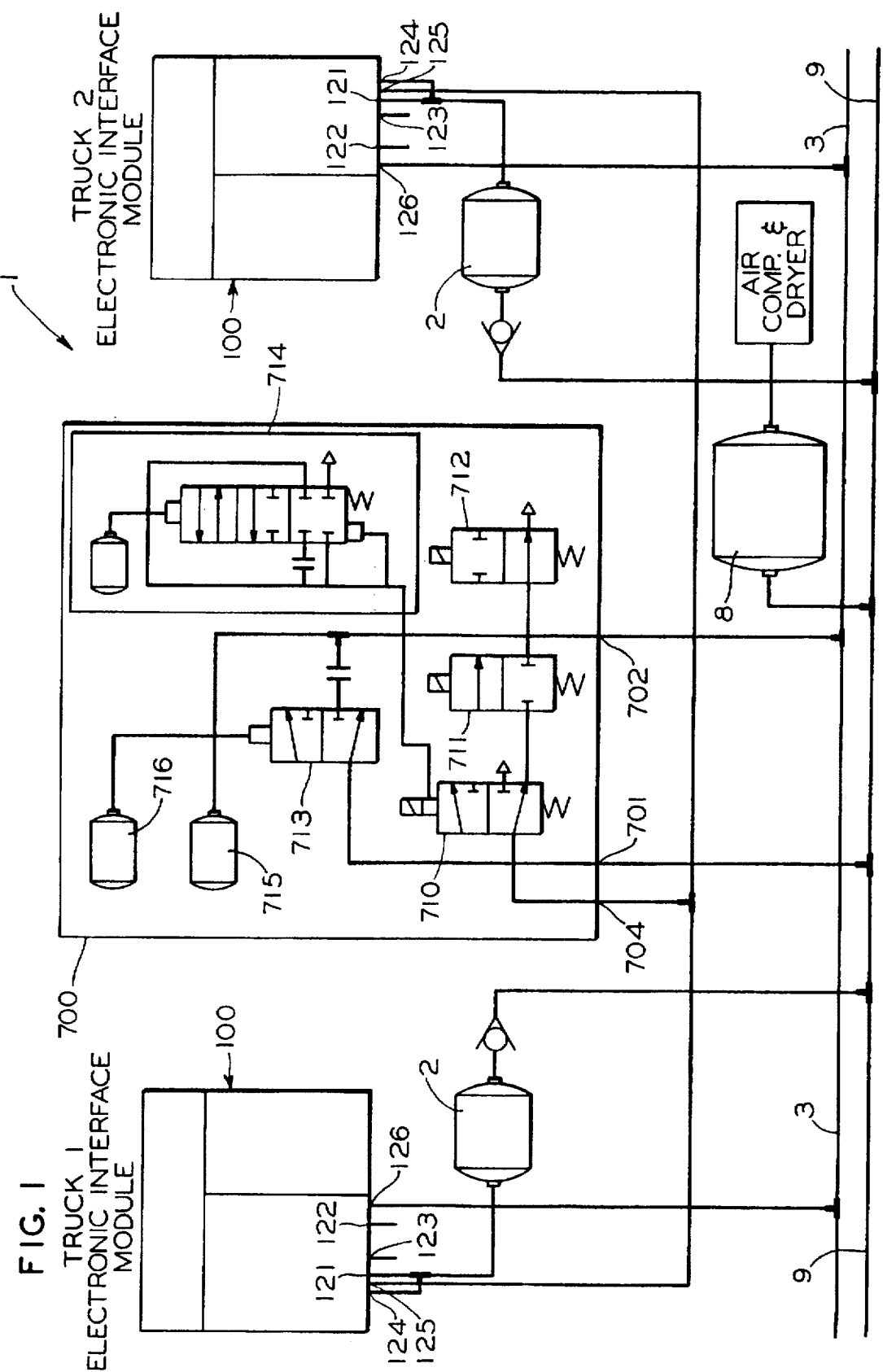
FIG. 1 is a partial schematic view of an RT-5 Brake Control System in which the present invention has been incorporated along with a universal pneumatic brake control unit.

Before describing the present invention in detail, the reader is advised that, for the sake of clarity and understanding, identical components having identical functions in each of the accompanying drawings have been marked with the same reference numerals in each of the Figures provided in this document.

FIG. 1 illustrates the essential details of a presently preferred embodiment of the present invention, namely, a service cut-out and brake pipe control unit, generally designated 700. Though it can be used within and made a part of a variety of train brake control systems, the SER. C.O. & BP control unit 700 is depicted within a WABCO RT-5 Brake Control System, generally designated 1, to aid in the control of the brakes of at least one truck on a rail vehicle.

FIG. 1 illustrates that the present invention 700 may be used in conjunction with two universal pneumatic brake control units 100 in the RT-5 Brake Control System. For reasons that will become more apparent from a reading of the ensuing paragraphs, one universal unit is preferably used to control the brakes on each truck of the rail vehicle. Basically, the present invention 700 not only serves as a source of brake control pressure for each universal unit 100 but also assists in charging, maintaining and reducing pressure within the brake pipe on the rail vehicle.

Figure 2:
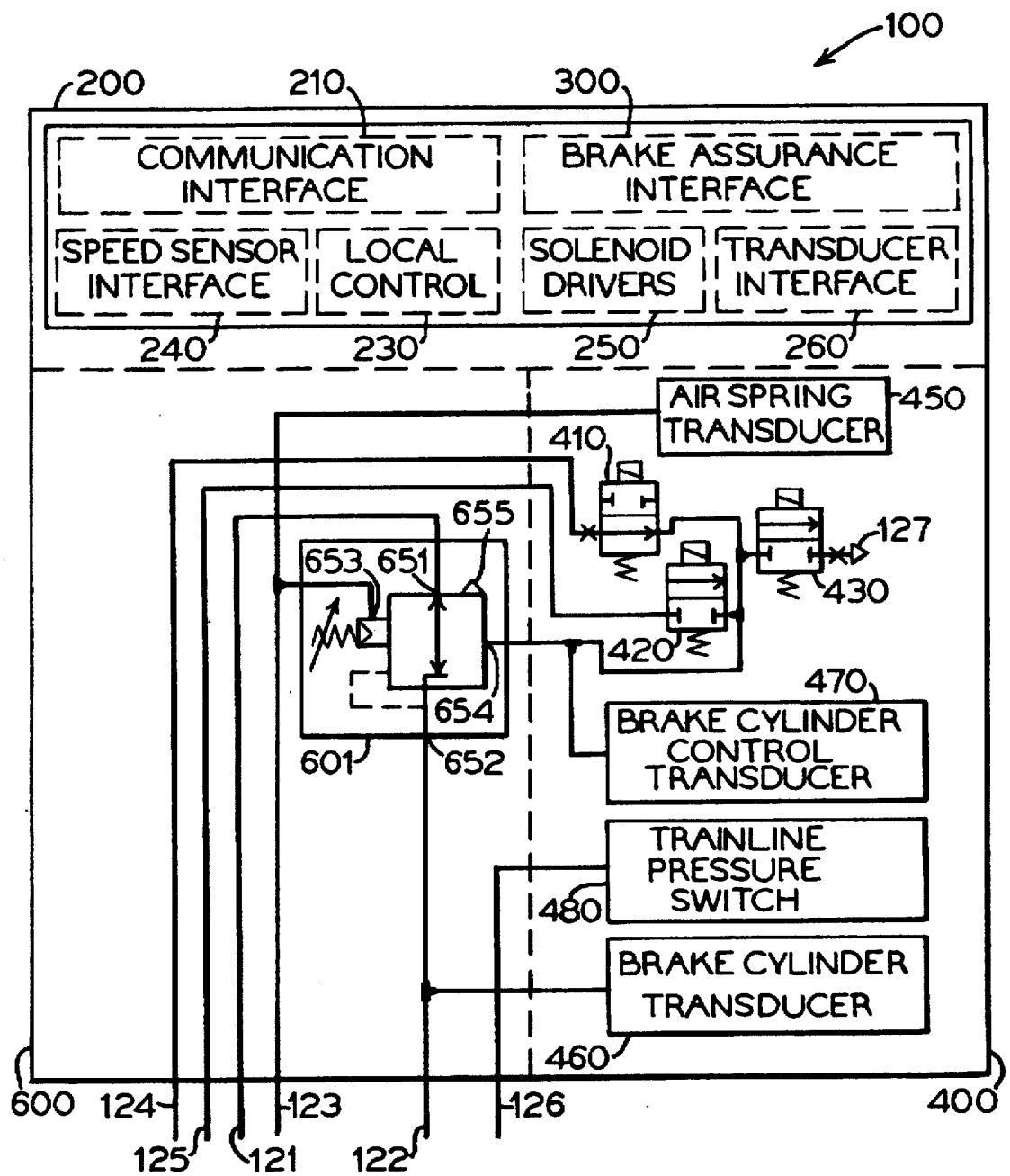
FIG. 2 is a schematic view of the universal brake control unit with which the present invention may cooperate.
Figure 3:
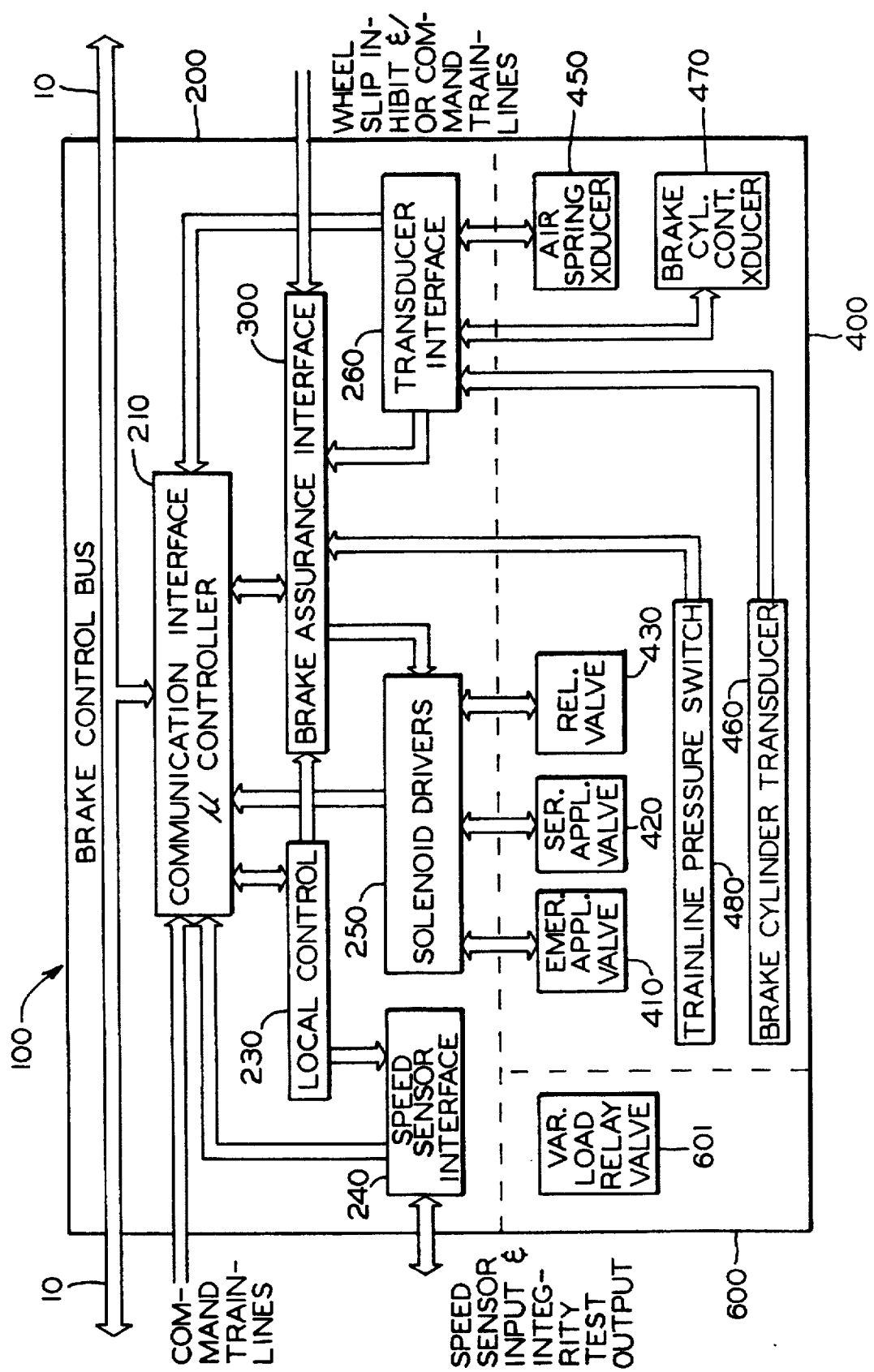
FIG. 3 is a schematic view of the universal brake control unit with which the present invention may cooperate.

Referring first to FIGS. 2 and 3, the universal unit basically comprises an electronics section 200, an electropneumatic section 400 and a pneumatic section 600. The electronic section 200 includes a communication interface means 210, a local control means 230, a speed sensor interface means 240, a solenoid driver means 250, a transducer interface means 260 and a brake assurance interface module 300. The electropneumatic section 400 includes an emergency application valve (EAV) 410, a service application valve (SAV) 420 and a release valve (RV) 430 along with an air spring transducer (AST) 450, a brake cylinder transducer (BCT) 460, a brake cylinder control transducer (BCCT) 470 and a trainline pressure switch 480. The pneumatic section 600 features a variable load relay valve (VLRV) 601.

The universal unit 100 connects pneumatically within the RT-5 Brake Control System 1 through several ports as shown in FIGS. 1 and 2. The input ports of universal unit 100 include a relay valve supply port 121, an air spring supply port 123, an emergency application supply port 124, a service application supply port 125 and a trainline pipe port 126. The output ports include a brake cylinder output port 122 and an exhaust port 127. The air spring supply port 123 receives air spring pressure from an air suspension system (not shown) on the rail vehicle in a manner well known in the brake control art. The service application supply port 125 receives a first source of pressure. The emergency application supply port 124 receives a second source of pressure. Relay valve supply port 121 receives a third source of pressure.

From the perspective of the universal units 100 illustrated in FIG. 1, the SER. C.O. & BP control unit 700 basically serves as the first source of pressure in the RT-5 Brake Control System. The main reservoir equalization (MRE) pipe 9 and the main reservoir 8 (via supply reservoir 2) basically serve as the second and third sources of pressure in brake control system 1. Trainline port 126 receives pressure from brake pipe 3 in the RT-5 System. The trainline or brake pipe pressure switch (BPPS) 480 monitors the pressure in brake pipe 3. When pressure in brake pipe 3 drops to an emergency level, BPPS 480 generates an electrical signal indicative of an emergency. BPPS passes this signal to brake assurance module 300 where it is used as more fully described in the applications cited above.

Referring still to FIGS. 1 and 2, the variable load relay valve 601 is an air piloted device whose construction and operation are well known in the brake control art. The VLRV 601 may optionally be replaced by a combination consisting of a variable load valve and a J-1 relay valve both of which are also well known. The VLRV 601 includes a supply port 651 connected to the third source of pressure via relay valve supply port 121, an output port 652 connected to the brake cylinders via brake cylinder output port 122, and a load weight port 653 connected to the air suspension system via air spring supply port 123 and a brake control port 654 connected both to the outputs of the EAV 410 and SAV 420 and to the input of the RV 430. The VLRV 601 also includes an exhaust port 655 through which pressure from the brake cylinders vents to atmosphere when the pressure at brake control port 654 falls below a minimal level in a manner well known in the art. SAV 420 when open allows a low capacity brake control pressure to pass from the first source of pressure to brake control port 654. EAV 410 when open allows a low capacity brake control pressure to pass from the second source of pressure to brake control port 654.

The VLRV 601 responds to either low capacity brake control pressure by providing from output port 652 a high capacity pressure to the brake cylinders. Though the air supplied to the brake cylinders will obviously be provided in greater quantity than the air received at brake control port 654, the air delivered to the brake cylinders (i.e., brake cylinder pressure) and the air delivered to brake control port 654 (i.e., brake control pressures) will be approximately equal in pressure as long as the brake cylinder pressure is below the air spring pressure provided to load weight port 653. Brake cylinder pressure is thus proportional to pressure that the VLRV 601 receives from the air suspension system. The VLRV 601 thus uses air spring pressure to limit the maximum pressure at which air is directed to the brake cylinders. The VLRV 601 thus compensates for the weight of the load borne by the rail vehicle during both service and emergency brake applications.

Regarding the pressure transducers in universal unit 100, the air spring transducer (AST) 450 monitors the air spring pressure at the load weight port 653 of the VLRV 601. The brake cylinder control transducer (BCCT) 470 monitors the brake control pressure at the brake control port 654 of the VLRV. The brake cylinder transducer (BCT) 460 monitors the pressure supplied to the brake cylinders from the output port 652 of the VLRV (i.e., the brake cylinder output port 22 of the universal unit).

The SAV, EAV and RV valves are each two-way magnet valves controlled by the electronic section 200 of universal unit 100 as indicated by FIGS. 2 and 3. The SAV 420 connects at its input port to the first source of pressure via the service application supply port 125 and at its output port connects to the brake control port 654 of the VLRV 601. The EAV 410 connects at its input port to the second source of pressure via the emergency application supply port 124 and at its output port to the brake control port 654 of the VLRV. The RV 430 connects at its input port to brake control port 654 and vents to atmosphere through its exhaust port 127.

The universal unit 100 connects electrically within the RT-5 Brake Control System 1 as best shown in FIG. 3. Each rail vehicle typically includes a master electronic unit (MEU) (not shown). The communication interface means 210 is the component through which universal unit 100 communicates with the MEU via a brake control bus 10 on the rail vehicle. The communication means 210 may take the form of any one of a variety of known devices used to communicate information between parts of an electronic system. Through brake control bus 10, the MEU communicates with and controls each of the universal units 100 on a given rail vehicle as explained more fully in the applications cited above. Brake control bus 10 can be either an electronic or a fiber optic link and use any one of a variety of communication protocols known in the communication art.

Referring now to FIG. 1, the present invention 700 incorporates into the RT-5 Brake Control System 1 along with the universal units 100. The SER. C.O. & BP control unit 700 includes an MRE pipe port 701, a brake pipe (BP) port 702 and a command output port 704. Regarding its pneumatic connections, SER. C.O. & BP control unit 700 connects to the MRE pipe 9 via MRE port 701 and to the brake pipe 3 via BP port 702. Command port 704 connects to the service application supply port 125 of each universal unit. Supply reservoir 2 of the RT-5 System connects to the relay valve supply port 121 and the emergency application supply port 124 of each universal unit 100.

The SER. C.O. & BP control unit 700 includes an emergency transfer valve (ETV) 710, a brake pipe charging valve (BP CHRG) 711, a brake pipe emergency release valve (BP EMER REL) 712, a brake pipe maintaining valve (BP MAIN) 713, a VX vent valve 714 and a low pressure switch 715. The present invention also includes a network N of pipes that serves as a common connection point as explained in the following paragraphs.

The ETV 710 is an air piloted valve whose operation depends on the pressure applied to its transfer pilot port. ETV 710 has three other ports: a stationary port, an emergency port and an exhaust port. The transfer pilot port is connected via BP port 702 to brake pipe 3. The stationary port is connected via command port 704 to the service application supply port 125 of each universal unit 100. The emergency port is connected via pipe network N to main reservoir 8 and MRE pipe 9. The exhaust port is connected to atmosphere.

While the pressure within brake pipe 3 exceeds a minimum level, ETV 710 connects its stationary and exhaust ports thereby venting to atmosphere the service application supply port 125 of each universal unit 100. The minimum level is preferably preselected to be the pressure at which a request for emergency braking is made via brake pipe 3. When the pressure within brake pipe 3 reaches or drops below the minimum level, ETV 710 as shown in FIG. 1 connects its emergency and stationary ports thereby connecting MRE pipe 9 and main reservoir 8 (via pipe network N) to the service application supply port 125 of each universal unit 100.

ETV 710 is the valve through which the first source of pressure supplies the input of SAV 420 of each universal unit 100. When there is no request for emergency braking via brake pipe 3, ETV 710 does not allow air to flow to the SAV magnet valve 420. When there is a request for emergency braking, ETV 710 supplies air from both main reservoir 8 and MRE pipe 9 to the SAV 420 of each universal unit 100.

BP CHRG 711 and BP EMER REL 912 are preferably magnet valves whose coils can be energized via electrical trainlines originating from brake control system 1. BP CHRG 711 connects at its input (via pipe network N) to MRE pipe 9 and main reservoir 8 and at its output to brake pipe 3. BP EMER REL 712 connects at its input to brake pipe 3 and at its exhaust port to atmosphere.

BP MAIN 713 is an air piloted valve whose operation depends on the pressure applied to its main pilot port. The main pilot port is connected to brake pipe 3. Like BP CHRG 711, BP MAIN 713 connects at its input (via pipe network N) to MRE pipe 9 and at its output to brake pipe 3. As long as the pressure at its main pilot port stays at or exceeds a minimum threshold, BP MAIN 713 connects its input and output ports thereby connecting (via a choke) MRE pipe 9 and main reservoir 8 to brake pipe 3. When the pressure at its main pilot port falls below the minimum threshold, BP MAIN 713 disconnects pipe network N from brake pipe 3.

From the foregoing and FIG. 1, it should be apparent that pipe network N basically interconnects the emergency port of ETV 710 and the inputs to BP CHRG 711 and to BP MAIN 713. Pipe network N also connects via MRE port 701 to MRE pipe 9.

The VX vent valve 914 is an air piloted valve whose operation and construction are well known in the brake control art. VX vent valve 714 includes two pilot ports and an exhaust port. Its operation depends on the difference in pressure applied to its two pilot ports. The first pilot port receives pressure mostly from a control volume while the second pilot port receives pressure from brake pipe 3 via BP port 702. The control volume charges with air received from brake pipe 3. If the pressure in brake pipe 3 drops at a slow enough rate, VX vent valve 714 will bleed the pressure contained in the control reservoir through a choke into brake pipe 3. If pressure in brake pipe 3 drops quickly enough (i.e., faster than a predetermined rate), VX vent valve 714 allows pressure in brake pipe 3 to vent quickly to atmosphere via its exhaust port. This quickly decreases pressure in brake pipe 3 so as to assist in propagating a request for emergency braking throughout the train.

The low pressure switch 715 is set to close when pressure in the brake pipe reaches or exceeds a preset low pressure. The preset low pressure is preferably set to a level that indicates that the brake pipe is indeed being charged and that there is continuity in the brake pipe throughout the train. Pressure switch 715 when closed connects a charging trainline from brake control system 1 to the coil of BP CHRG 711. The charging trainline typically carries power only when a manually operated button on the cab control unit/ central controller of brake control system 1 is pressed.

The SER. C.O. & BP control unit 700 may optionally include a high pressure switch 716 set to close when pressure in the brake pipe reaches or exceeds a preset high pressure. The preset high pressure is preferably set to a level (e.g., 85–90 psi) higher than to what BP MAIN 913 reacts. The high pressure switch 716 when closed preferably energizes some sort of indicator in the cab. High pressure switch 716 can thus be used as part of a circuit through which to inform the train operator that the brake pipe is indeed fully charged or at least approaching a fully charged state.

BP CHRG 711, BP EMER REL 712 and BP MAIN 713 work cooperatively with each other to charge, maintain or reduce pressure in brake pipe 3 according to commands received from brake control system 1. BP CHRG 711 is a normally deenergized (closed) valve which in the absence of an emergency braking request may be opened via the charging trainline when low pressure switch 715 is closed and the manually operated button is pressed. When open, BP CHRG 711 allows air from MRE pipe 9 (via pipe network N) to charge brake pipe 3 via BP port 702. BP EMER REL 712 is a normally deenergized (opened) valve which can be closed via an emergency release trainline. Typically, BP EMER REL 712 should be deenergized (opened) at the same time that the brake control system sends the emergency brake request along brake pipe 3 to each rail vehicle in the train. When open, the BP EMER REL 712 on each rail vehicle allows pressure in brake pipe 3 to vent to atmosphere. BP EMER REL 712 is the valve at the rail vehicle level that assists in quickly reducing pressure in the brake pipe 3 throughout the train.

The BP CHRG 711, BP EMER REL 712 and BP MAIN 713 valves and pressure switch 715 essentially serve a protective function within the brake control system in which the present invention 700 is incorporated. Before the train departs from a stop, for example, brake control system 1 begins charging brake pipe 3 so as to release the brakes on each of the rail vehicles of the train. In each rail vehicle, when pressure in brake pipe 3 reaches or exceeds the preset low pressure, pressure switch 715 closes thereby enabling brake control system 1 to energize BP CHRG 711 via the charging trainline. Meanwhile, BP EMER REL 712 is energized (closed) via the emergency release trainline. When low pressure switch 715 is closed and the manually operated button is pressed, BP CHRG 711 opens thereby allowing air via main reservoir 8 and MRE pipe 9 to charge brake pipe 3. BP CHRG 711 thus assists in quickly increasing pressure in brake pipe 3 and releasing the brakes on the rail vehicle.

Once the train operator concludes that pressure in brake pipe 3 has reached a satisfactory level (e.g., 75–90 psi) via a gauge or other device, the operator will release the button thereby closing BP CHRG 711 and preventing further flow of air via pipe network N through BP CHRG 711 to brake pipe 3. The satisfactory level at which the operator may release the button is preferably chosen to be at least at the minimum threshold of BP MAIN 713. This assures that BP MAIN 713 can perform its maintaining function and pressure in brake pipe 3 will not again drop unintendedly.

Once brake pipe 3 has charged to the satisfactory level and BP CHRG 711 closes, the BP MAIN 713 should be able to maintain pressure within the brake pipe. As long as the pressure at its main pilot port stays at or exceeds the minimum threshold, BP MAIN 713 via the choke maintains the flow of air from main reservoir 8 and MRE pipe 9 to brake pipe 3. BP MAIN 713 can thus be used to maintain a full release pressure level (e.g., 110 psi) within brake pipe 3 as long as the pressure at its main pilot port remains at or above the minimum threshold. Should the pressure at its main pilot port drop below the minimum threshold, BP MAIN 713 disconnects main reservoir 8 and MRE pipe 9 from brake pipe 3. The BP MAIN valve 713 thus maintains pressure in the brake pipe to offset minor leakage.

The operation of VX vent valve 714, unlike BP MAIN 713, depends upon the rate at which the pressure drops within brake pipe 3. Should pressure within the brake pipe drop precipitously (i.e., faster than the predetermined rate), VX vent valve 714 allows air in brake pipe 3 to vent quickly to atmosphere via its exhaust port in the manner indicated previously. If the pressure in brake pipe 3 drops rapidly enough, even if it is still above the minimum threshold of BP MAIN 713, BP MAIN 713 cannot maintain pressure within brake pipe 3 due to the limited rate at which air can flow through its choke and the much faster rate at which the pressure is dropping in the brake pipe via vent valve 714. Once pressure at its main pilot port descends to or below the minimum threshold, BP MAIN 713 closes thereby preventing flow of air from main reservoir 8 and MRE pipe 9 into brake pipe 3. VX vent valve 714 thus quickly decreases pressure in brake pipe 3 so as to assist in propagating the emergency braking request throughout the train.

It should be apparent to persons skilled in the brake control art that the present invention 700 may conceivably be employed on brake control systems other than the RT-5 System discussed above. Obvious modifications may be necessary, though, such as changing the manner in which the invention connects to the brake control system. This would, of course, depend upon the specific application in which the invention is employed.

The present invention 700 and the universal units 100 work in tandem to assure proper operation of the brakes on the rail vehicle in which they are installed. The MEU controls the magnet valves 410, 420 and 430 of each universal unit 100 through which air received from the first and second sources of pressure can flow. By controlling these magnet valves and thus the control pressure that may be applied to brake control port 654 of VLRV 601, the MEU affects how pressure received from the third source of pressure is conveyed by each universal unit 100 to the brake cylinders of a truck. It is the present invention 700 that is the conduit for or the provider of the first source of pressure in the RT-5 System.

SER. C.O. & BP control unit 700 operates in response to pressure within brake pipe 3 and to commands that BP CHRG 711 and BP EMER REL 712 receive via the central controller (not shown) of brake control system 1. Generally, in response to movement of a brake handle into an emergency position, the RT-5 System through its central controller will send an emergency braking request along brake pipe 3 to each rail vehicle in the train. Pressure within brake pipe 3 varies according to whether it carries an emergency braking request. SER. C.O. & BP control unit 700 receives air from MRE pipe 9 at the emergency port of ETV 710 via MRE port 701.

Regarding how the present invention 700 operates in response to an absence of an emergency braking request, when no emergency braking request from brake pipe 3 (i.e., high pressure) is applied to its transfer pilot port, ETV 710 connects its stationary and exhaust ports. This allows the service application supply port 125 of each universal unit 100 to vent to atmosphere. The central controller of the RT-5 System may also be charging brake pipe 3 via BP CHRG 711 as described previously or BP MAIN 713 may be maintaining pressure within brake pipe 3 as also described previously.

Given the absence of an emergency braking request in brake pipe 3, the state of the SAV magnet valve 420 of each universal unit 100 is therefore inconsequential from the perspective of the present invention 700. As described in the applications cited above, however, local control means 230, as used in the RT-5 System, would typically keep SAV 420 in its normally deenergized (closed) state. This would allow the pressure at brake control port 654 of VLRV 601 to be affected only through EAV magnet valve 410.

Regarding how the present invention 700 operates in response to an emergency braking request, when an emergency braking request (i.e., no or low pressure) is applied to its transfer pilot port, ETV 710 connects its emergency and stationary ports. This allows air from MRE pipe 9 to flow via MRE port 701 through ETV 710 via command port 704 to the SAV magnet valve 420. ETV 710 is thus the valve through which the present invention 700 provides the first source of pressure to each universal unit 100.

Coincident with sending the emergency braking request along brake pipe 3, the local control means 230 in the RT-5 System would typically energize (open) the SAV magnet valve 420 as described more fully in the applications cited above. RV magnet valve 430 would then be placed in its normally deenergized (closed) state. Pressure within MRE pipe 9 and main reservoir 8 would then flow (via pipe network N and ETV 710) to magnet valve SAV 420. Main reservoir 8 and MRE pipe 9 (via command port 704) thus ultimately act as the first source of pressure for the SAV valves 420 of the two universal units 100 shown in FIG. 1.

Regarding how the present invention 700 operates in response to a service braking request, the RT-5 System orders an application of the brakes on each rail vehicle typically by sending the service braking request along an electrical trainline to the MEU. The RT-5 System, of course, can also release the service brakes by sending the release braking request along this or another electrical trainline to the MEU. The MEU processes the service and release braking requests as well as various other signals and determines a brake force command signal as mentioned below and as best described in the applications cited above. The brake force command signal is communicated to each universal unit 100. Other than responding to the presence or absence of the emergency braking requests and to the energizing and deenergizing of the BP CHRG 711 and BP EMER REL 712 valves, the present invention 700 generally plays no other major role within the RT-5 Brake Control System.

The present invention 700 and the universal units 100 thus work in tandem to assure proper operation of the truck brakes on the rail vehicle in which they are installed. The MEU receives the service and release braking requests (i.e., the brake command signal) and the other signals from brake control system 1. It is through these signals that the MEU initiates the application and release of service braking on the trucks of the rail vehicle according to the Brake Control Process depicted in blocks 1–15 of FIG. 4.

Figure 4A:
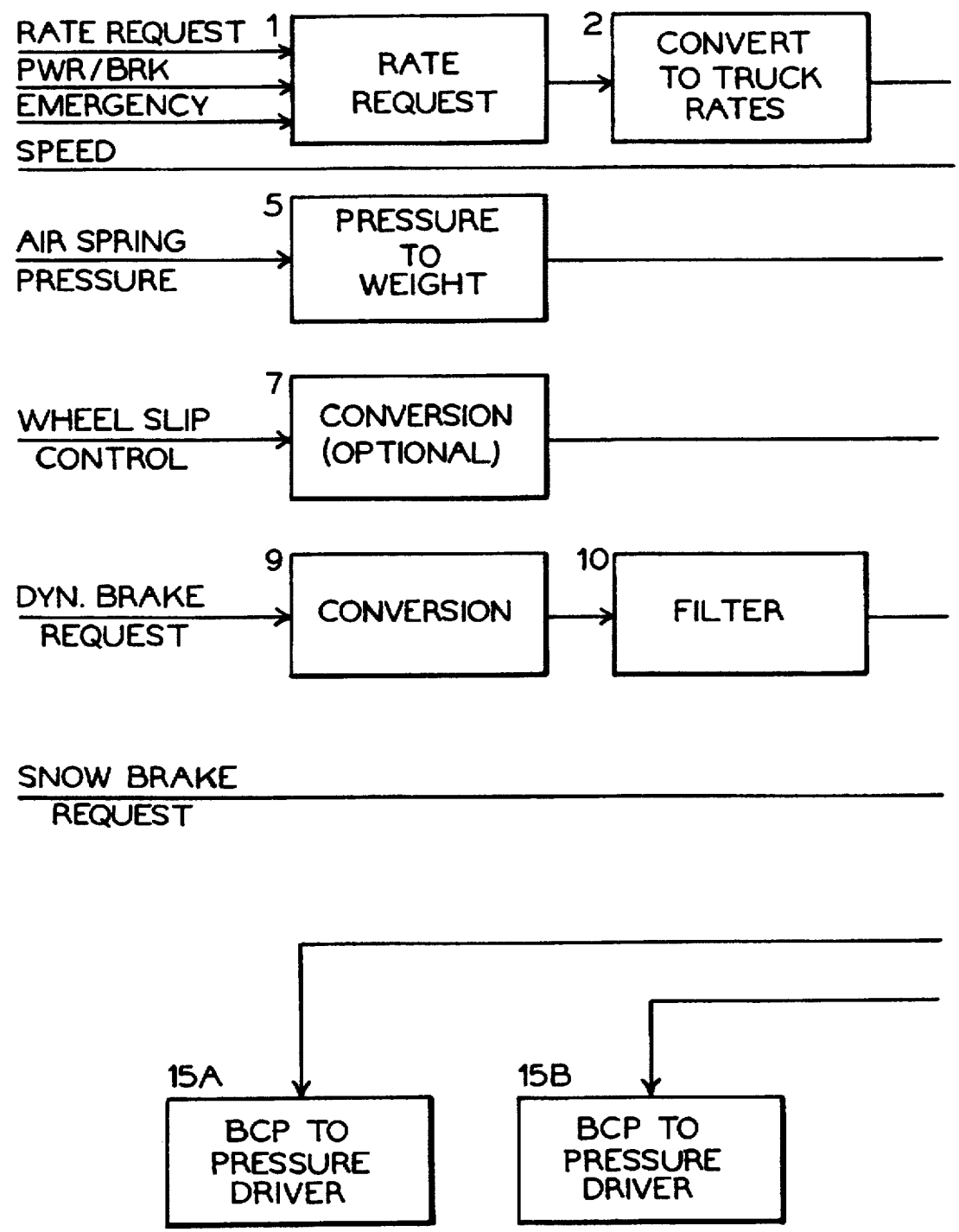
FIG. 4 is a block diagram that illustrates a brake control process.
Figure 4B:
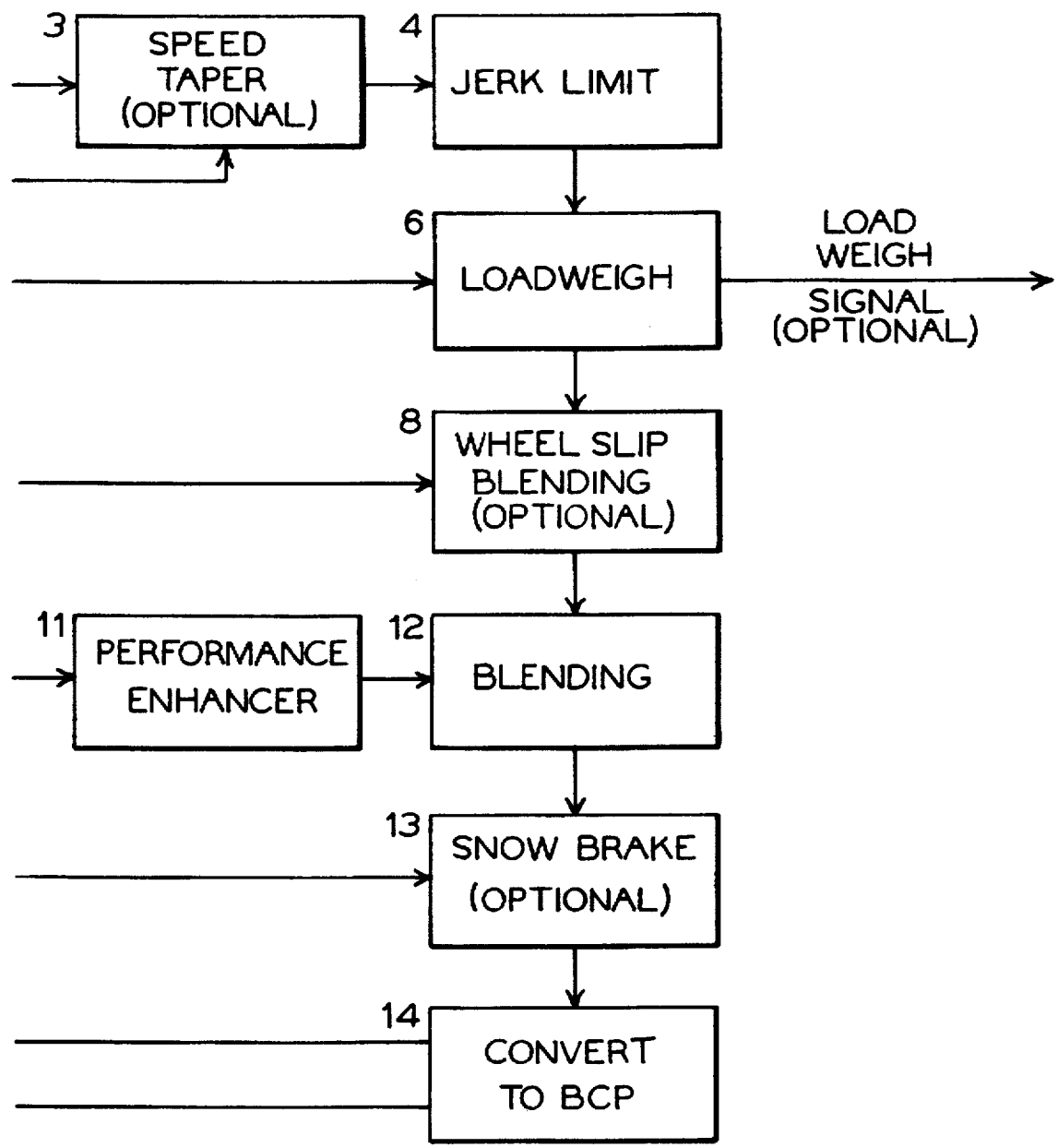
Figure 5A:
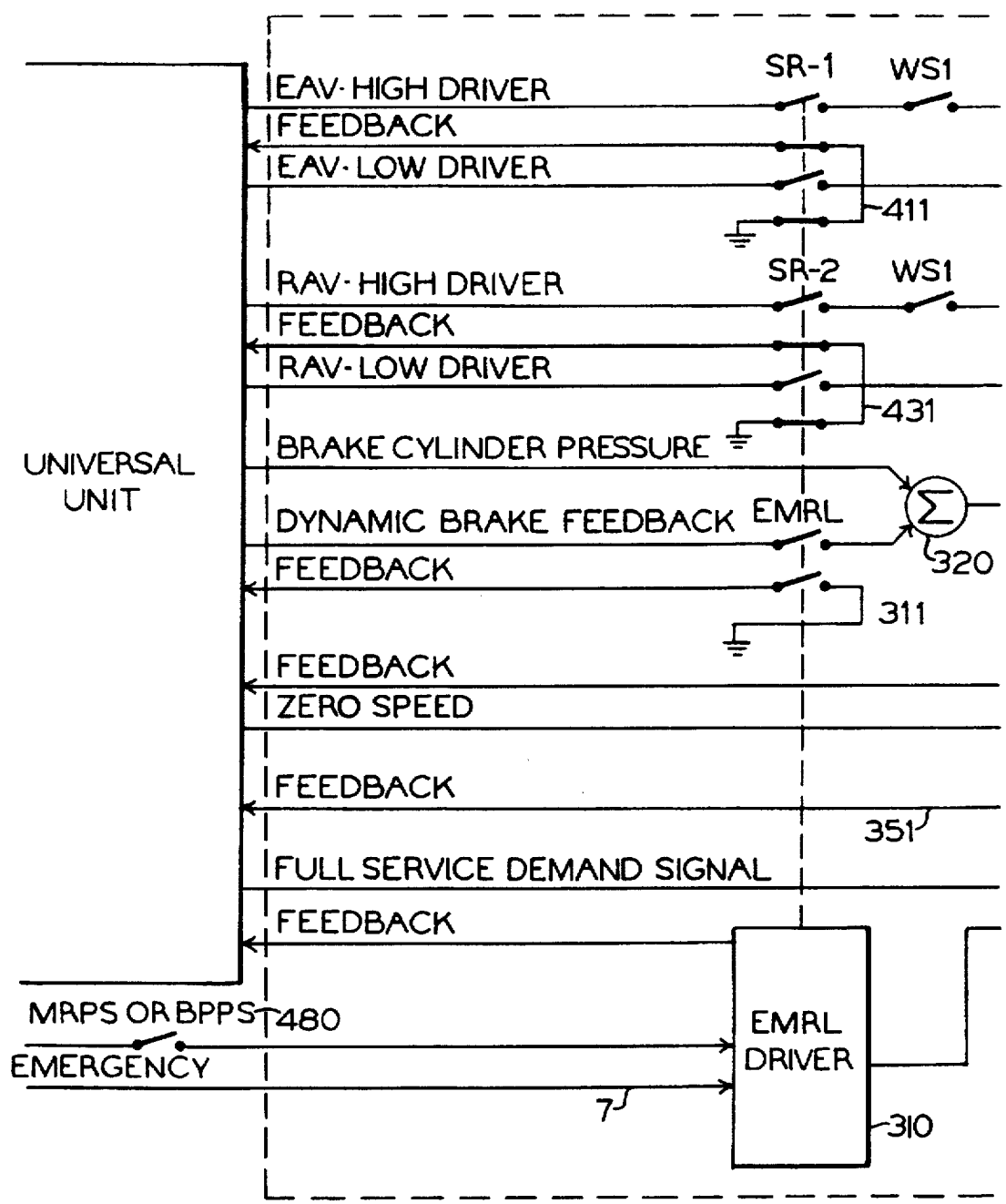
FIG. 5 is a schematic view of a brake assurance module of the universal brake control unit shown in FIGS. 2 and 3.
Figure 5B:
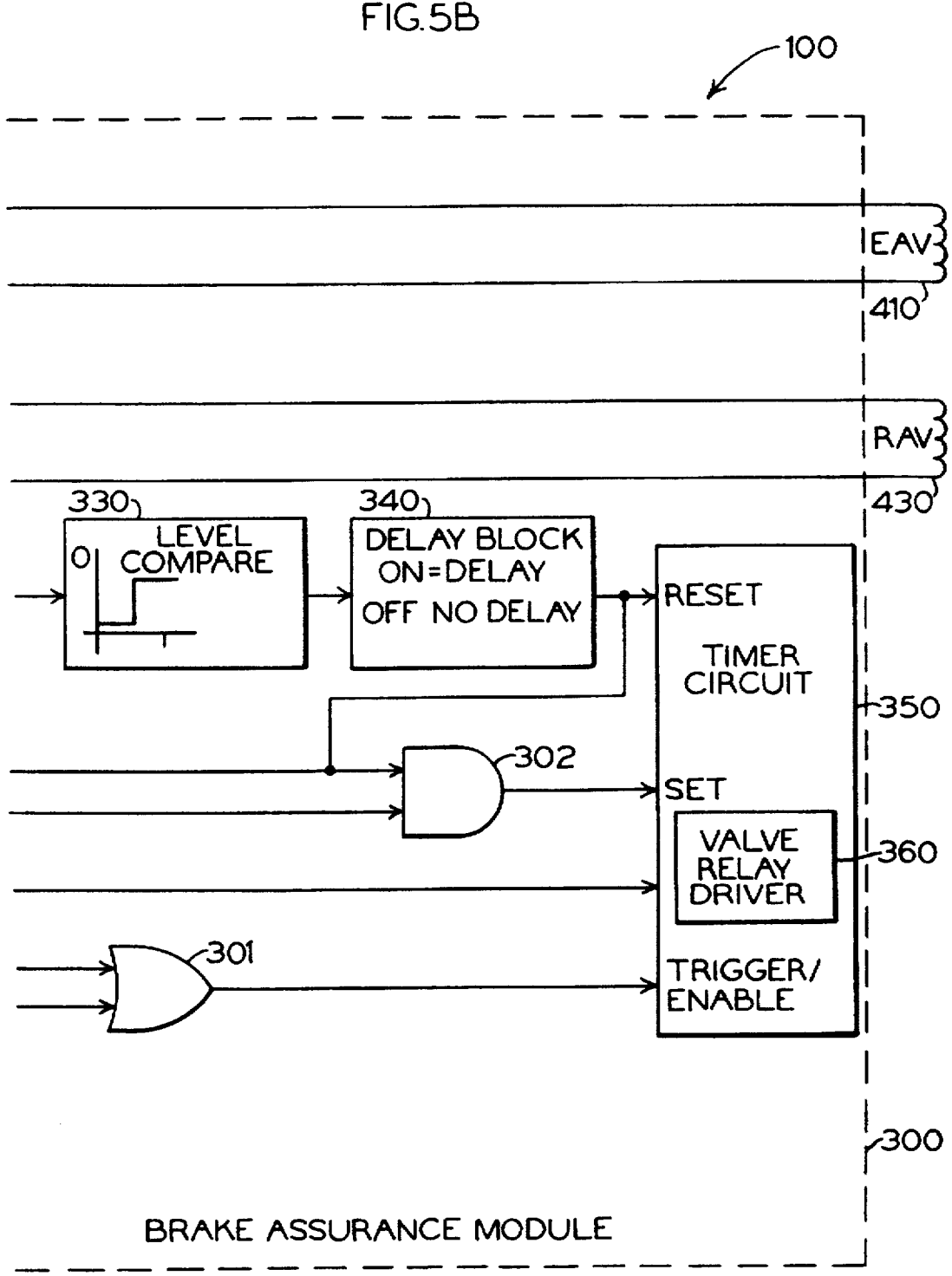

This Brake Control Process is somewhat different than the prior art brake control process described in the background, especially as it pertains to the functions illustrated in blocks 15A and 15B. As best shown in FIG. 4, the MEU receives various signals and determines the brake force command signal. The MEU, for example, reads the rate request signal, the power/brake signal and the emergency brake signal received from the brake control system as shown in block 1. In the RT-5 Brake Control System illustrated in FIG. 1, the brake command signal (i.e., rate request signal) is the service or release braking request conveyed along electrical trainline (s) directly to the MEU in each rail vehicle. The emergency brake signal is the emergency braking request typically conveyed along brake pipe 3 to BPPS 480 to brake assurance module 300 and ultimately to the MEU. The emergency brake signal may also be conveyed directly to the MEU along an electrical trainline. Depending on the particular system in which the present invention is employed, the rate request signal may be representative not only of the brake command signal but also the rate at which to propel the rail vehicle during propulsion. As is known in the art, the power/brake signal is used in conjunction with the rate request signal to distinguish whether the train is in the braking mode or the propulsion mode.

Described in greater detail in the applications cited above, the Brake Control Process is the procedure that the MEU uses to determine the brake force command signal. Briefly, the MEU uses these signals to determine initially the rate at which the entire train is to be braked. The MEU may then perform other steps of the Brake Control Process including speed tapering, jerk limiting, load compensation, wheel slip control, compensation for dynamic braking and compensation for whatever snow braking force may be applied to the wheels. Ultimately, the MEU generates the brake force command signal. Blocks 15A and 15B illustrate that the brake force command signal takes the form of a voltage or current signal that can be processed by each universal unit 100 on the rail vehicle. This signal represents the pressure that the MEU believes ought to be supplied to the brake cylinders of each truck. It is communicated to each universal unit 100 as indicated in blocks 15A and 15B.

Each universal unit 100 receives the brake force command signal as well as certain other signals as more fully set forth in the applications cited above. Simply stated, each universal unit, rather than the MEU, separately controls the brakes on its truck. Through its local control means 230, the universal unit 100 determines whether the brake control pressure from command port 704 of the present invention 700 reaches (via SAV 420) brake control port 654 of VLRV 601 during an emergency braking request. The local control means 230 may either open or close SAV 420 according to the brake force command signal it receives from the MEU and the brake control pressure feedback signal it receives ultimately from BCCT 470 in universal unit 100. If SAV 420 is opened during an emergency braking request, VLRV 601 responds to the brake control pressure by providing a corresponding pressure to the brake cylinders that is proportional to pressure that VLRV 601 receives from the air suspension system. This yields a final friction braking effort to the wheels of the truck that compensates for the weight of the load borne by the rail vehicle. The brakes of each truck are thus controlled by one of the universal units 100 as shown in FIG. 1.

Though they operate preferably in an RT-5 Brake Control System along with the present invention 700, the MEU and the universal unit 100 nevertheless involve matters whose details are outside the scope of the present invention. Accordingly, the operation of the MEU and a more detailed description of the universal unit 100 can be found in the applications cited above.

While the presently preferred embodiment and various related aspects of the present invention 700 have been set forth in detail according to the Patent Act, those persons of ordinary skill in the technical art to which this invention pertains will recognize various alternative ways of practicing the invention without departing from the spirit and scope of the appended claims.

Accordingly, to promote the progress of science and useful arts, we secure for ourselves by Letters Patent exclusive rights to all subject matter embraced by the following claims for the time prescribed by the Patent Act.

We claim:

1. A pneumatic trainline control unit for use with a universal pneumatic brake unit on a rail vehicle of a train, said universal unit includes a relay valve supply port, a service application supply port and an emergency application supply port, said rail vehicle includes a supply reservoir for conveying air to said relay valve supply port and to said emergency application supply port, a main reservoir equalization pipe for conveying air to said supply reservoir and to said control unit and a brake pipe for conveying an emergency braking request, said train includes a central controller for issuing said braking request, said control unit comprising:

(a) an emergency transfer valve having a transfer pilot port in communication with said brake pipe such that said emergency transfer valve permits said service application supply port to vent to atmosphere unless said transfer pilot port receives said emergency braking request in which case said emergency transfer valve permits a pipe network to communicate with said service application supply port;

(b) a low pressure switch set to close when pressure in said brake pipe reaches or exceeds a preset low pressure;

(c) a brake pipe charging valve for allowing air from said pipe network to charge said brake pipe to at least a minimum threshold pressure once said charging valve is opened upon both closure of said low pressure switch and command from said central controller;

(d) a brake pipe emergency release valve for venting air from said brake pipe to atmosphere when said emergency release valve is opened by said central controller approximately coincident with issuance of said emergency braking request;

(e) a brake pipe maintaining valve having a main pilot port in communication with said brake pipe such that said maintaining valve maintains pressure within said brake pipe by permitting air from said pipe network to charge said brake pipe via a choke unless pressure at said main pilot port falls below said minimum threshold in which case said maintaining valve closes thereby preventing air from said pipe network from so charging said brake pipe;

(f) said pipe network for allowing air received from said main reservoir equalization pipe to flow to said emergency transfer valve, said charging valve and said maintaining valve; and (g) a vent valve for venting air from said brake pipe to atmosphere when pressure within said brake pipe drops faster than a predetermined rate so as to assist in propagating said emergency braking request throughout said train.

2. The pneumatic trainline control unit recited in claim 1 further includes a high pressure switch set to close when pressure in said brake pipe reaches or exceeds a preset high pressure and used in a circuit through which to inform a train operator of same.

3. A pneumatic trainline control unit for use with a brake control system of a train, said train includes a main reservoir equalization pipe for conveying air to said control unit, a brake pipe for conveying an emergency braking request and a central controller for issuing said braking request, said control unit comprising:

(a) an emergency transfer valve having a transfer pilot port in communication with said brake pipe such that said emergency transfer valve permits a command port of said control unit to vent to atmosphere unless said transfer pilot port receives said emergency braking request in which case said emergency transfer valve permits a pipe network to communicate with said command port;

(b) a low pressure switch set to close when pressure in said brake pipe reaches or exceeds a preset low pressure;

(c) a brake pipe charging valve for allowing air from said pipe network to charge said brake pipe to at least a minimum threshold pressure once said charging valve is opened upon both closure of said low pressure switch and a manually initiated command from said central controller;

(d) a brake pipe emergency release valve for venting air from said brake pipe to atmosphere when said emergency release valve is opened by said central controller;

(e) a brake pipe maintaining valve having a main pilot port in communication with said brake pipe such that said maintaining valve maintains pressure within said brake pipe by permitting air from said pipe network to charge said brake pipe via a choke unless pressure at said main pilot port falls below said minimum threshold in which case said maintaining valve closes thereby preventing air from said pipe network from so charging said brake pipe;

(f) said pipe network for allowing air received from a main reservoir equalization port of said control unit to flow to said emergency transfer valve, said charging valve and said maintaining valve; and (g) a vent valve for venting air from said brake pipe to atmosphere when pressure within said brake pipe drops faster than a predetermined rate.

4. The pneumatic trainline control unit recited in claim 3 further includes a high pressure switch set to close when pressure in said brake pipe reaches or exceeds a preset high pressure and used in a circuit through which to inform a train operator of same.

5. A pneumatic trainline control unit for use with a brake control system of a train, said train includes a first pneumatic trainline for conveying air to said control unit, a second pneumatic trainline for conveying a braking request to said control unit and a central controller for issuing said braking request, said control unit comprising:

(a) a transfer valve having a transfer pilot port in communication with said second pneumatic trainline such that said transfer valve permits a command port of said control unit to vent to atmosphere unless said transfer pilot port receives said braking request in which case said transfer valve permits a pipe network to communicate with said command port;

(b) a low pressure switch set to close when pressure in said second pneumatic trainline reaches or exceeds a preset low pressure;

(c) a charging valve for allowing air from said pipe network to charge said second pneumatic trainline to at least a minimum threshold pressure once said charging valve is opened upon both closure of said low pressure switch and a manually initiated command from said central controller;

(d) an emergency release valve for venting air from said second pneumatic trainline to atmosphere when said emergency release valve is opened by said central controller;

(e) a maintaining valve having a main pilot port in communication with said second pneumatic trainline such that said maintaining valve maintains pressure within said second pneumatic trainline by permitting air from said pipe network to charge said second pneumatic trainline via a choke unless pressure at said main pilot port falls below said minimum threshold in which case said maintaining valve closes thereby preventing air from said pipe network from so charging said second pneumatic trainline;

(f) said pipe network for allowing air received from said first pneumatic trainline to flow to said transfer valve, said charging valve and said maintaining valve; and (g) a vent valve for venting air from said second pneumatic trainline to atmosphere when pressure within said second pneumatic trainline drops faster than a predetermined rate.

6. The pneumatic trainline control unit recited in claim 5 further includes a high pressure switch set to close when pressure in said second pneumatic trainline reaches or exceeds a preset high pressure and used in a circuit through which to inform a train operator of same.

* * * * *